Feb. 15, 1966 H. W. KOGELNIK ETAL 3,235,813

OPTICAL MASER AMPLIFIERS WITH OPTIMUM SIGNAL TO NOISE RATIO

Filed June 25, 1963 3 Sheets-Sheet 1

INVENTORS H. W. KOGELNIK
A. YARIV

BY Kenneth W. Mateer

ATTORNEY

Feb. 15, 1966 H. W. KOGELNIK ETAL 3,235,813

OPTICAL MASER AMPLIFIERS WITH OPTIMUM SIGNAL TO NOISE RATIO

Filed June 25, 1963 3 Sheets-Sheet 3

United States Patent Office 3,235,813
Patented Feb. 15, 1966

3,235,813

OPTICAL MASER AMPLIFIERS WITH OPTIMUM SIGNAL TO NOISE RATIO

Herwig W. Kogelnik, Summit, and Amnon Yariv, Chatham, N.J., assignors to Bell Telephone Laboratories, Incorporated, New York, N.Y., a corporation of New York Filed June 25, 1963, Ser. No. 290,357
5 Claims. (Cl. 330—4.3)

This invention relates to optical maser amplifiers and, more particularly, to optical maser amplifiers characterized by optimum signal to noise ratio.

The advent of the optical maser, or laser, has made possible the generation and amplification of electromagnetic wave energy in a frequency range which, for the purposes of the present specification is termed optical frequency range and which extends from the far infrared, through the visible, to and through the ultraviolet. The availability of coherent wave energy at such high frequencies has made possible communication systems in which enormous amounts of information can be simultaneously transmitted.

In nearly all communication systems, amplification is necessary both initially at the transmitter and periodically along the transmission path to ensure a reasonable path length before transmission attenuation causes the signal amplitude to fall below the minimum level for detection.

A recurring problem in amplifiers is the introduction of noise by the system components themselves. In many amplification systems, the noise level limits its information carrying capacity. In optical maser arrangements, the information carrying capacity can be improved by reducing the amount of noise introduced by the amplifier without at the same time reducing the signal level.

The relative power levels of signal and noise, typically denoted as the signal to noise ratio, can be controlled over a considerable range by properly structuring the system components.

It is therefore the object of the present invention to improve optical maser amplifier performance.

It is a more specific object of the invention to optimize the signal to noise ratio in optical maser amplifier geometries.

A. L. Schawlow and C. H. Townes, in their paper "Infrared and Optical Masers" which begins at page 1940 of volume 112 of Physical Review (1958), indicate that the noise level of an optical maser can be reduced by focusing the radiation emitted at one end wall of the maser onto a black screen in the focal plane, the screen having a small hole therein which will pass radiation from a single desired mode.

In accordance with the present invention, we have discovered that the lens and aperture arrangement of Schawlow and Townes, while serving to reduce the noise level, does not itself optimize the signal to noise ratio of an amplifier. Additionally, we have discovered that the signal to noise ratio associated with any stream of lenses and apertures following the amplifying medium can be optimized by particularly structuring the energy beam incident upon the medium. More specifically, an optical source and its associated optical system are structured in accordance with the invention to ensure a beam spotsize and wavefront configuration in the output plane of the amplifier which are related to specific parameters of the amplification system.

The above and other objects of the invention, its nature, and its various advantages and features can be more fully understood by reference to the accompanying drawing in which.

Figure 1:
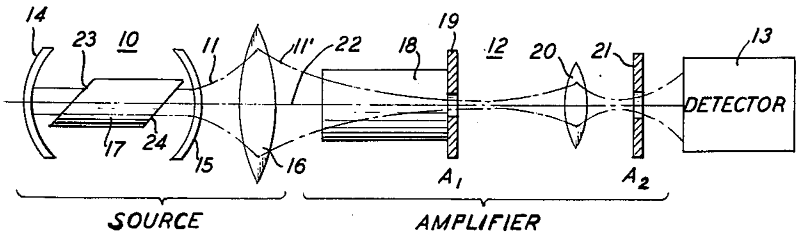
FIG. 1 is a schematic view of an optical maser amplifier in accordance with the invention.

Referring now to FIG. 1 in detail, there is shown an optical system comprising maser oscillator 10 emitting a signal beam 11 which passes through maser amplifier 12 and is ultimately incident upon a suitable optical detector 13. As shown, oscillator 10 comprises an optically resonant cavity formed by concave spherical reflecting end members 14, 15, of which reflector 15 is advantageously partially transmissive to permit abstraction of energy for external utilization. Focusing means 16 is positioned external to the cavity along the axis 22 of energy beam 11. Disposed within cavity 10 between reflectors 14, 15 is a maser medium indicated in FIG. 1 as rodlike member 17 with Brewster angle end surfaces 23, 24. The active medium, which can be any of the many gaseous and solid state media now known in the optical maser art, has pump apparatus associated with it for producing therein the negative temperature condition which is requisite for optical maser operation. Since the nature of the pump apparatus is determined by the particular characteristics of the maser medium selected, illustration of the pump is omitted in the interest of clarity.

Figure 2:
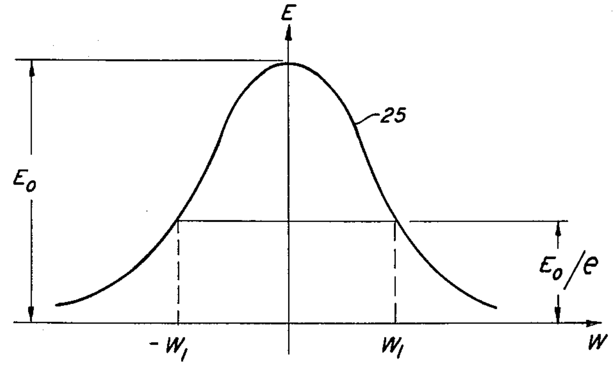
FIGS. 2, 3 and 6 are illustrations given for purposes of explanation.

Radiation beam 11 comprises solely the fundamental transverse mode associated with oscillator 10, which is operated for example in the manner reported by H. W. Kogelnik and W. W. Rigrod in volume 50 of the Proceedings of the IRE, page 220, February, 1962. Such operation produces a beam having essentially the Gaussian beam distribution illustrated in FIG. 2, in which the amplitude E of the electric field strength is plotted as curved solid line 25 as a function of transverse distance $w$ across the beam, according to the mathematical relation $$E=E_0 \exp\left(-\frac{w_2}{w_1^2}\right)$$

Maximum field strentgh $E_0$ occurs at the beam center with decreasing amplitude as the distance from center is increased. At the points $w=\pm w_1$, the beam amplitude has fallen to a value $E_{0/e}$, where $e$ is the base of natural logarithums. For the purposes of this specification the width of the beam between those locations for which the beam amplitude equals $E_{0/e}$ will be defined as the spotsize of the beam at any point along the axis of beam propagation. Thus, for a typical beam of circular cross section, beam spotsize can be represented by a radius, which is equal to one half the defined beam width.

Figure 3:
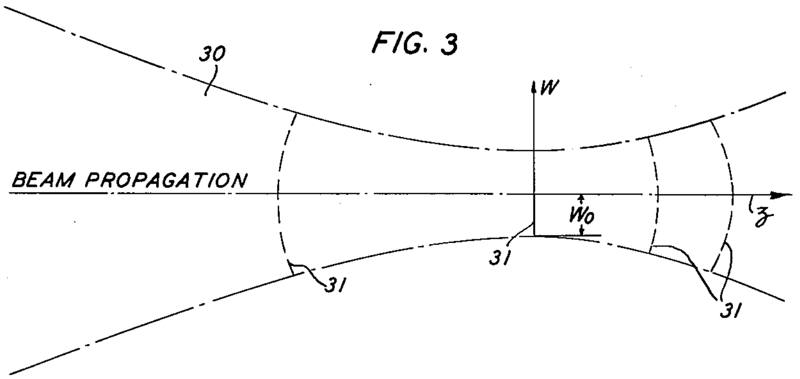

A typical Gaussian beam such as beam 11 emitted by oscillator 10 of FIG. 1 is illustrated in detail in FIG 3, in which beam 30 propagates symmetrically along and parallel to the $z$ axis, with a beam spotsize minimum of $w_0$ at location $z=0$. As seen in FIG. 3, the spotsize varies as a function of distance along $z$. A Gaussian beam is characterized by spherical wavefronts, or surfaces of constant phase, indicated by dashed lines 31, the radii of curvature of which vary as the beam is traversed in either direction along $z$ away from the point $z=0$, at which the wavefront has an infinite radius of curvature.

From the paper by Boyd and Gordon, volume 40 of the Bell System Technical Journal 489, 1961, the spotsize radius $w_1$ and the radius of curvature $b'$ for the Gaussian beam of FIG. 3 at any point along the $z$ axis are defined by $$w_1=w_0\sqrt{1+\frac{\lambda^2 z^2}{\pi^2 w_0^4}} \quad (1)$$

and $$b' = z + \pi^2 \frac{w_0^4}{\lambda^2 z} \qquad (2)$$

where $\lambda$ is the wavelength of the signal beam. The significance of the above Gaussian beam description with respect to the present invention will become apparent hereinafter.

Figure 4:
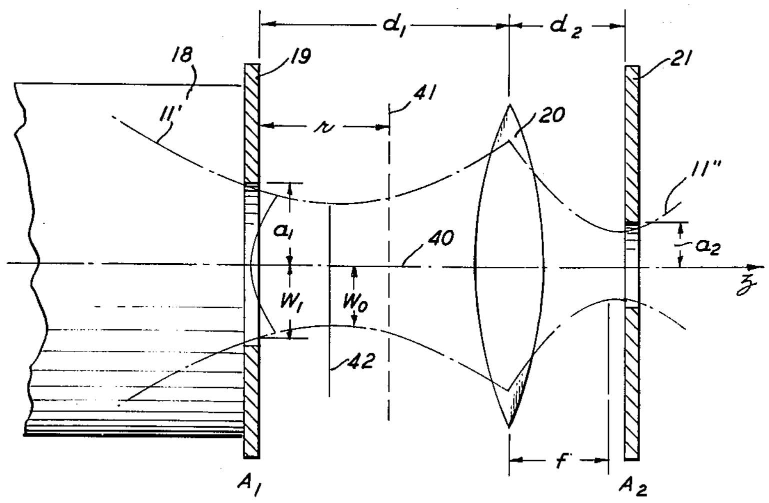
FIGS. 4 and 5 are detailed views of portions of an amplifier similar to that of FIG. 1.

Returning now to FIG. 1, the Gaussian energy beam 11 from oscillator 10 emerges as beam 11' from lens 16, which comprises low loss optical material transparent to optical energy of the signal frequency, and is incident upon laser amplifier 12 which comprises negative temperature medium 18, substantially similar to medium 17 described with respect to oscillator 10. Since amplifying medium 18 acts in part as a noise source, the level of noise at detector 13 will include a portion of the noise emitted by the amplifying medium. In order to optimize the amplifier performance, it is necessary that an optical system be introduced following the amplifying medium to restrict such noise to an acceptable level. Having thus limited the noise, the signal to noise ratio can be optimized by properly structuring the signal beam. In FIG. 4, the amplifying portion of the system of FIG. 1 is illustrated in detail.

Apertured screen 19 having an aperture of radius $a_1$ and area $A_1$ is positioned adjacent one extremity of negative temperature medium 18, symmetrically about propagation axis 40, which is also designated the $z$ axis. Spaced away from screen 19 and also centered upon axis 40 is apertured screen 21, having an aperture of radius $a_2$ and area $A_2$. Lens 20, of focal length $f$, is positioned between screens 19, 21 at respective distances $d_1$, $d_2$. In accordance with well-known optical principles, lens 20 "images" screen 21 in a plane normal to axis 40 and containing dashed line 41, the specific location of the image plane depending upon the focal length and position of lens 20. The Gaussian beam 11' from amplifying medium 18 is incident upon the system of screens 19, 21 and lens 20, emerging therefrom as signal beam 11''. Signal beam 11' is characterized by a signal power $S_0$ passing through screen 19 and beam 11'' is characterized by a signal power S passing through screen 21. At the same time a noise power N passes through screen 21, related to a noise power $N_0$ which is a characteristic of the amplifying medium 18. Mathematically, $S=\tau S_0$ and $N=\alpha N_0$, where $\tau$ is the signal transmission factor and $\alpha$ is the noise acceptance factor. The signal to noise ratio of the system of FIG. 4 can thus be defined as $$\frac{S}{N} = \frac{\tau S_0}{\alpha N_0} = \eta \frac{S_0}{N_0}$$

$\alpha$ is completely determined by the configuration of the aperture and lens system and is a measure of the portion of the noise emitted at screen 19 which will be accepted at the output of screen 21. For the configuration of FIG. 4, $$\alpha = \frac{A_1 A_2}{\lambda^2 d^2} \qquad (3)$$

where $$d = d_1 + d_2 - \frac{d_1 d_2}{f} \qquad (4)$$

The parameter $\tau$ is determined in part by the aperture and lens configuration following amplifying medium 18 and in part by the structure of the signal beam at screen 19.

As illustrated in FIG. 4, the Gaussian beam 11' has a minimum spotsize $w_0$ in plane 42, at which the equiphase wavefront of beam 11' is plane, or spherical with an infinite radius of curvature. As one moves away from plane 42 along axis 40 however, the equiphase wavefronts of the beam become spherical with finite radii of curvature. Furthermore, as seen in FIG. 4, the beam spotsize $w_1$ at screen 19 is seen to be greater than the minimum beam spotsize, but less than the radius of the aperture of the screen. These relative dimensions vary with the value chosen for $\alpha$.

In accordance with the invention, the signal to noise ratio of an optical maser amplifier for an incident Gaussian beam containing solely the fundamental mode of an optical maser source can be optimized by properly configuring the signal beam in the plane of the output from the active medium. Specifically, the radius of curvature of the phase front tangent to the apertured screen at the active medium output should be equal to the spacing $r$ between said screen and the image of the screen 21 produced by lens 20. Additionally, the beam spotsize in the plane of the output screen must be equal to the radius of the aperture therein divided by the fourth root of the acceptance factor, i.e., $$w_1 = \frac{a_1}{\sqrt[4]{\alpha}} \qquad (5)$$

Figure 5:
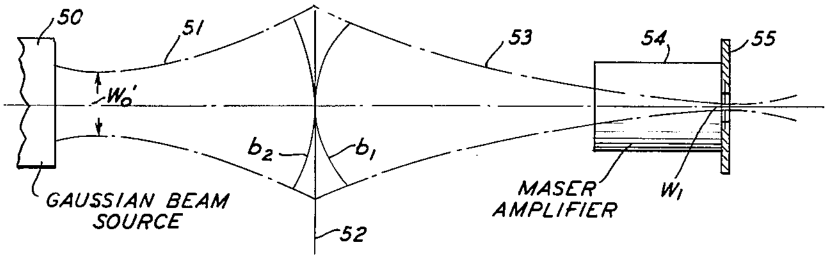

One simple means for providing a signal beam configuration in accordance with the invention is shown in FIG. 5 in which Gaussian beam source 50 emits a beam 51 which is to be amplified by passage through maser amplifier 54, intended to be a portion of the amplifier system of FIG. 4. Therefore, in accordance with the invention, the required spotsize $w_1$ at screen 55 and the required radius of the equiphase front of beam 53 at screen 55 are known. So also is the minimum spotsize $w_0'$ of beam 51 emitted from source 50. By utilizing Equations 1 and 2, the radii of curvature $b_2$, $b_1$ of beams 51, 53 respectively can be determined at plane 52 between source 50 and amplifier 54, plane 52 being that location at which the spotsizes of the beams are equal. A matching lens can be introduced at plane 52 having a focal length $f$ determined by the well known relation $$\frac{1}{b_1} + \frac{1}{b_2} = \frac{1}{f} \qquad (6)$$

Since the parameters of the Gaussian beam are fixed by the relationship of Equations 1 and 2, and the phase fronts are matched in accordance with Equation 6, the resulting optical maser amplifier will be characterized by an optimum signal to noise ratio. Various other arrangements of telescopes and/or lenses can be used to produce, in accordance with known optical principles, a signal beam at screen 55 structured in accordance with the invention.

Figure 6:
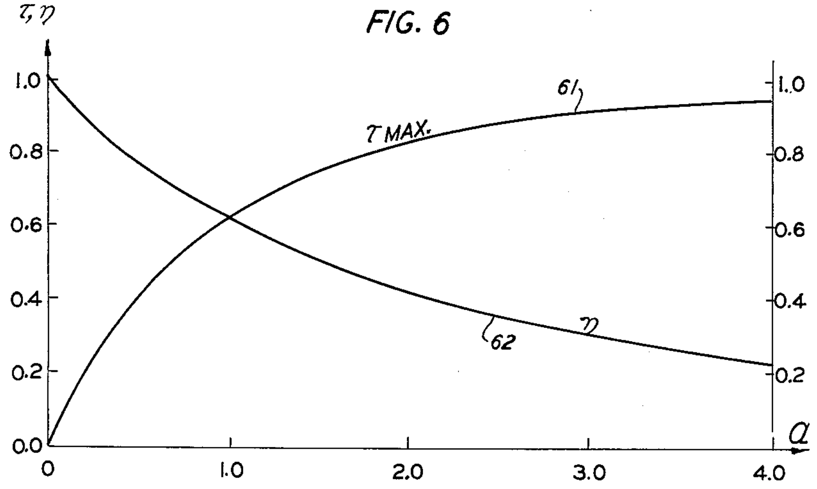

FIG. 6 is a graphical representation of the interrelation of the optimized parameters in accordance with the invention. The acceptance factor $\alpha$ is plotted along the abscissa as a function of the maximized parameter $\tau$ in curve 61 and the parameter $\eta$ in curve 62. As is evident from the graph, $$\eta = \frac{\tau}{\alpha}$$

The particular operating point of an optimum signal to noise ratio amplifier along curve 62 is determined by the selection of $\alpha$, the acceptable noise level. Concomitant with the selection of $\alpha$, the maximum possible level of signal which will be transmitted by the optimum $S/N$ geometery is fixed. Thus, as more noise is accepted ($\alpha$ increasing) the amount of signal transmitted for optimum $S/N$ ratio, proportional to curve 61, will increase, but the optimum $S/N$ ratio, proportional to curve 62, will decrease. For other than the optimum conditions specified by the present invention signal transmission levels below curve 61 will result. In the absence of special circumstances, operation at an acceptance factor of unity represents a reasonable compromise between transmitted signal amplitude and value of signal to noise ratio.

Figure 7:
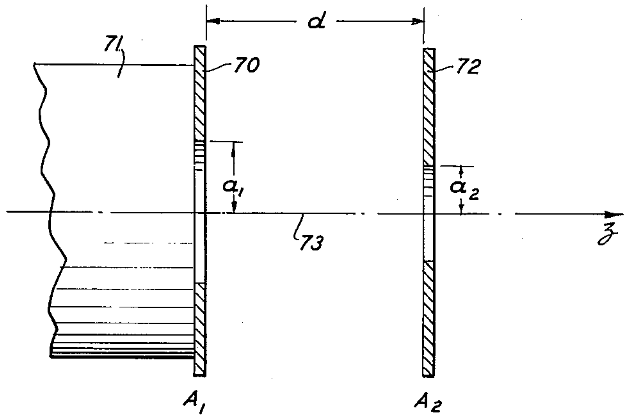
FIG. 7 is an alternative maser geometry to which the invention has application.

FIG. 7 is a schematic representation of an alternative maser amplifier output system to which the invention has application. As illustrated, output screen 70, having an aperture therein of area $A_1$ and radius $a_1$ is positioned at one extremity of maser amplifying medium 71, with screen 72 having an aperture therein of area $A_2$, and radius $a_2$ positioned parallel to and at a distance $d$ from screen 70. Medium 71 and screen 70, 72 are positioned symmetrically with respect to propagation axis 73, designated $z$. The absence in FIG. 7 of a focusing lens between the apertured screens should be noted. Operation with optimum signal to noise ratio in the arrangement of FIG. 7 is derived by using the actual spacing $d$ in the acceptance factor definition of Equation 3, rather than the more complicated expression of Equation 4. The actual plane of screen 72 and the plane of its image are, accordingly, coincident.

While the invention has been specifically disclosed with reference to only two optical output systems it is clear that additional embodiments involving various positionings of lenses and screens can be employed. For example, in FIG. 4, if the focal length of lens 20 is made equal to the distance $d_2$, the image of screen 21 appears at infinity, thereby requiring that the radius of curvature of the signal beam be infinite at output screen 19. Accordingly, the wavefront at screen 19 would be plane and the beam spotsize would be at its minimum there.

Furthermore, it is desirable to introduce a polarization selective device in the signal beam path between the amplification medium and the detector in order to pass the polarized signal substantially unaffected while simultaneously reducing noise power which reaches the detector by a factor of two. This well known device has been omitted from the drawing in the interest of clarity.

The invention has been described throughout with respect to a signal beam of Gaussian transverse field distribution, and as has been stated, the use of such a beam produces the optima of FIG. 6. Any other beam configuration would result in amplifier performance below the realizable optimum.

What is claimed is:

1. An optical maser amplifier having a given axis of beam propagation comprising a negative temperature medium disposed on said axis, means for pumping said medium to establish a population inversion therein, first aperture means having an aperture of radius $a_1$ positioned on said axis in a first plane at the extremity of said medium, second aperture means having an aperture of radius $a_2$ in a second plane which is spaced away along said axis from said first plane, focusing means disposed between said first and second aperture means along said axis, said focusing means effecting an image of said second aperture means in a third plane different from said second plane, said first and second aperture means and said focusing means defining a noise acceptance factor $\alpha$ for a given wavelength of interest, and means for illuminating said negative temperature medium along said axis with a signal beam having a Gaussian transverse field distribution, said signal beam having a spotsize in said first plane equal to $$\frac{a_1}{\sqrt[4]{\alpha}}$$

said signal beam having a wavefront of constant phase tangent to said first plane with a radius of curvature equal to the distance between said third plane and said first plane.

2. An optical maser amplifier having a given axis of beam propagation comprising a negative temperature medium disposed on said axis, means for pumping said medium to establish a population inversion therein, first aperture means having an aperture of radius $a_1$ positioned on said axis in a first plane at the extremity of said medium, second aperture means having an aperture of radius $a_2$ in a second plane which is spaced away along said axis from said first plane, said first and second aperture means defining a noise acceptance factor $\alpha$ for a given wavelength of interest, and means for illuminating said negative temperature medium along said axis with a signal beam having a Gaussian transverse field distribution, said signal beam having a spotsize in said first plane equal to $$\frac{a_1}{\sqrt[4]{\alpha}}$$

said signal beam having a wavefront of constant phase tangent to said first plane with a radius of curvature equal to the distance between said first and said second planes.

3. An optical maser amplifier having a given axis of beam propagation comprising a negative temperature medium disposed on said axis, means for pumping said medium to establish a population inversion therein, an optical output system having a noise acceptance factor $\alpha$ positioned on said axis beyond said medium in the propagation direction.

said optical system comprising first aperture means having an aperture of radius $a_1$ positioned in a first plane at the extremity of said medium and second aperture means having an apparent optical position in a second plane different from said first plane, means for illuminating said negative temperature medium along said axis with a signal beam having a Gaussian transverse field distribution, said signal beam having a spotsize in said first plane equal to $$\frac{a_1}{\sqrt[4]{\alpha}}$$

said signal beam having a wavefront of constant phase tangent to said first plane with a radius of curvature equal to the distance between said first and said second planes.

4. The amplifier according to claim 3 in which said optical system includes focusing means disposed on said axis, and said second plane contains the image of said second aperture means produced by said focusing means.

5. The amplifier according to claim 3 in which the plane of said second aperture means is coincident with said second plane.

No references cited.

NATHAN KAUFMAN, *Acting Primary Examiner.*

D. R. HOSTETTER, *Examiner.*